United States Patent Office 3,052,595
Patented Sept. 4, 1962

3,052,595
METHOD FOR INCREASING FILLER
RETENTION IN PAPER
David J. Pye, Concord, Calif., assignor to The Dow Chemical Company, Midland, Mich., a corporation of Delaware
No Drawing. Filed May 11, 1955, Ser. No. 507,732
2 Claims. (Cl. 162—164)

This invention relates to the manufacture of paper and paper products and is particularly directed to a method for increasing the retention of fillers in paper and decreasing the loss of filler materials in the white water waste from paper making.

In the manufacture of many types of paper and paper products, mineral fillers are incorporated with the pulp to improve such properties as color opacity and printability. A large portion of the fillers so added to the pulp ordinarily passes through the paper-making screen into the "white water" which drains from the paper web on the screen. This not only represents an uneconomic loss of raw material but also results in a waste disposal problem.

According to the present invention, it has been discovered that the incorporation of small amounts of a high molecular weight acrylamide polymer in mixtures of paper pulp and mineral filler results in increased retention of the filler by the paper formed from such pulp-filler mixture. It has also been discovered that the inclusion of a small proportion of bentonitic clay in the filler further enhances the activity of the acrylamide polymer for improving filler retention. It is among the advantages of the invention that the white water resulting from the manufacture of paper in accordance with the present invention contains a decreased load of suspended matter and thus constitutes less of a waste disposal problem.

A principal embodiment of the invention is illustrated schematically by the following flow sheet:

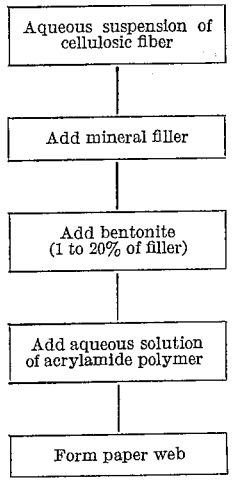

The acrylamide polymers effective in the present invention are water soluble and have a low degree of cross-linking between polymer chains. The term, "acrylamide polymer," as employed in the present specification and claims, is inclusive of the homopolymer of acrylamide and also copolymers of acrylamide with up to about 15 percent by weight of other suitable monomers such as acrylic and methacrylic acid and their alkyl esters, methacrylamide, styrene, vinyl acetate, acrylonitrile, methacrylonitrile, vinyl alkyl ethers, vinyl and vinylidene chloride and the like, each such polymer being characterized by water solubility and low cross-linking as described above.

In a preferred embodiment of the invention, the acrylamide polymers employed are characterized by a viscosity of at least about 1 centipoise for a 0.5 percent by weight solution thereof in distilled water adjusted to a pH of 3 to 3.5 and a temperature of 25° C., as determined with an Ostwald viscosimeter. Wherever the term "viscosity," is hereinafter used, it refers to the viscosity of an aqueous 0.5 percent solution in accordance with the above description.

In carrying out the invention the acrylamide polymer is dissolved in water and incorporated with the prepared paper pulp in any suitable fashion. Usually a dilute aqueous solution of the acrylamide polymer is employed to facilitate the rapid and uniform distribution of the polymer through the pulp suspension. In general, a solution containing from about 0.01 to about 1 percent by weight of the polymer is employed. Such solution is distributed in the prepared pulp either before or after the addition of fillers. The choice of concentration of acrylamide polymer in the aqueous solution is governed somewhat by the viscosity of the polymer. Thus, for example, polymers of relatively low viscosity may be employed in more concentrated solutions, that is, from about 0.5 to 1 percent by weight, whereas polymers of high viscosity are advantageously used in more dilute solutions, that is, less than about 0.5 percent by weight.

The proportion of acrylamide polymer to filler employed will vary depending upon such factors as the type and previous history of the paper pulp, the degree of beating or refining of the pulp fibers, the particular filler being used and the viscosity rating of the polymer. In general, good results are obtained when incorporating in the pulp from about 0.005 to about 0.25 percent by weight of acrylamide polymer based on the weight of filler employed. Within the above suggested range, the preferred loading is inversely proportional to the viscosity rating of the polymer employed.

The mineral fillers suitable for use in the practice of the invention are chosen in accordance with conventional practice depending upon the particular property desired in the finished paper. Thus, for example, kaolinite, titanium dioxide, talc, diatomaceous earth, terra alba, burnt gypsum, calcium or magnesium carbonate, barium sulfate, zinc sulfide, lithopone and the like or mixtures thereof may be employed. Conventional practice includes the use of various of the foregoing in the range of from about 10 to about 60 percent by weight of the weight of cellulosic fiber in the dispersed pulp.

In that preferred mode of operation wherein a small proportion of bentonite is employed, the latter is incorporated in the pulp in any suitable fashion. Thus, for example, the bentonite may be blended with other mineral fillers in the dry state and the resulting mixture then be dispersed in water to form a slurry for addition to the pulp suspension. In any case it is preferred that the bentonite be admixed with the pulp in the form of an aqueous slurry and be dispersed in the pulp-filler mixture prior to the addition of the acrylamide polymer solution. In such operations it has been found advantageous to employ from about 1 to about 20 percent by weight of bentonite based on the total weight of mineral filler in the pulp suspension. When operating in such manner the bentonite and acrylamide polymer are mutually activating whereby increased retention of the filler in the paper web and decreased turbidity of the resulting white water are obtained. The term "bentonite" as herein employed includes the common bentonites of commerce and also other clays having predominantly a montmorillonite structure, as for example, certain fuller's earths. Of these bentonites those having the property of swelling in water are preferred.

The following examples illustrate the invention but are not to be construed as limiting the same.

*Example 1*

Paper pulp consisting essentially of alpha cellulose was macerated and mechanically beaten in water to form a 1 percent cellulosic pulp suspension. This pulp suspension was divided into equal portions each containing 100 parts by weight of cellulosic fiber. One such portion was used directly for forming a paper web on a 78-mesh screen.

A further portion of the pulp suspension was mixed with 20 parts by weight of a kalonite filler and the resulting mixture employed in forming a paper web as above.

Further portions of the pulp suspension were mixed with varying amounts of an acrylamide polymer followed by 20 parts by weight of the kaolinite filler. The resulting mixtures were employed in producing paper webs as above. The acrylamide polymer used had a viscosity of 9.8 centipoises and was added in the form of an aqueous 0.04 percent by weight solution.

In each of the above operations, the white water draining from the paper-making screen was collected and the turbidity thereof determined in a Klett-Summerson photoelectric colorimeter against a water blank. The results are summarized in the following table wherein the percent acrylamide polymer is the percent by weight based on the weight of filler in the mixture and the percent kaolinite is the percent by weight based on the weight of cellulosic fiber in the mixture.

| Percent Acrylamide Polymer | Percent Kaolinite | Turbidity Reading |
|---|---|---|
| None | None | 32 |
| None | 20 | 310 |
| 0.0125 | 20 | 190 |
| 0.025 | 20 | 180 |

*Example 2*

A cellulosic pulp suspension prepared as in Example 1 was divided into equal portions each containing 100 parts by weight of cellulosic fiber. One such portion was used directly for forming a paper web on a 78-mesh screen.

A further portion of the pulp suspension was mixed with sufficient of an aqueous slurry containing 2 percent by weight/volume of a kaolinite filler to provide 20 parts by weight of kaolinite in the mixture. The resulting mixture was employed in forming a paper web as above.

Further portions of the pulp suspension were mixed with the above 2 percent kaolinite slurry to provide 20 percent of kaolinite based on the weight of fiber in the suspension and varying amounts of a slurry containing 2 percent by weight/volume of bentonite were added. To each of these pulp-filler mixtures, 0.0025 part by weight of an acrylamide polymer was added with stirring and the resulting mixture employed in forming a paper web as above. The acrylamide polymer used had a viscosity of 9.8 centipoises and was added in the form of an aqueous 0.04 percent by weight solution.

The white water draining from the screen in each of the above operations was collected and the turbidity thereof determined as in Example 1. The results are summarized in the following table wherein the percent kaolinite is percent by weight based on the weight of cellulosic fiber in the suspension and the percent bentonite and percent acrylamide polymer are percents by weight based on the weight of kaolinite filler in the mixture.

| Percent Kaolinite | Percent Acrylamide Polymer | Percent Bentonite | Turbidity Reading |
|---|---|---|---|
| None | None | None | 50 |
| 20 | None | None | 260 |
| 20 | 0.0125 | 2 | 75 |
| 20 | 0.0125 | 5 | 56 |
| 20 | 0.0125 | 10 | 56 |
| 20 | 0.0125 | 20 | 120 |

*Example 3*

Equal volumes of a 1 percent pulp suspension prepared as in Example 1 were mixed with an aqueous slurry containing 2 percent by weight/volume of kaolinite to provide a series of pulp-filler mixtures containing 20 percent by weight of kaolinite based on the weight of cellulosic fiber in the suspension. To each such mixture, sufficient of an aqueous 2 percent by weight/volume slurry of bentonite was added to provide 2 percent by weight of bentonite based on the weight of kaolinite. The bentonite employed was a swelling bentonite identified as hectorite and sold as MH Bentonite. Varying amounts of an acrylamide polymer solution were admixed with individual pulp-filler mixtures as prepared above and the resulting suspensions employed for the preparation of paper webs on a 78-mesh screen. The acrylamide polymer employed had a viscosity of 9.2 centipoises and was added in the form of an aqueous 0.04 percent by weight solution.

The white water draining from the screen in each of the above operations was collected and the turbidity thereof determined as in Example 1. Similar determinations were made for comparative purposes on the white water from: (1) an equal volume of the untreated 1 percent pulp suspension, (2) a pulp-kaolinite filler mixture prepared as above without the addition of the bentonite and acrylamide polymer, and (3) a pulp-kaolinite filler mixture, as prepared above, treated with acrylamide polymer without any addition of bentonite. The results are summarized in the following table wherein the percent kaolinite is percent by weight based on the weight of cellulosic fiber in the suspension and the percent bentonite and percent acrylamide polymer are percents by weight based on the weight of kaolinite filler in the mixture.

| Percent Kaolinite | Percent Bentonite | Percent Acrylamide Polymer | Turbidity Reading |
|---|---|---|---|
| None | None | None | 79 |
| 20 | None | None | 435 |
| 20 | 2 | None | 477 |
| 20 | 2 | 0.024 | 95 |
| 20 | 2 | 0.064 | 75 |
| 20 | 2 | 0.256 | 33 |
| 20 | None | 0.256 | 126 |

*Example 4*

Further determinations were carried out according to the general method of Example 2 using the acrylamide polymer and pulp suspension of Example 3. The white water turbidities were determined as in the preceding example and are reported in the following table wherein the percentages are calculated as in Example 2.

| Percent Kaolinite | Percent Acrylamide Polymer | Percent Bentonite | Turbidity Reading |
|---|---|---|---|
| None | None | None | 79 |
| 20 | None | None | 435 |
| None | 0.064 | None | 165 |
| 20 | 0.064 | 2 | 75 |
| 20 | 0.064 | 5 | 56 |
| 20 | 0.064 | 10 | 71 |
| 20 | 0.064 | 20 | 73 |

*Example 5*

A 1 percent pulp suspension prepared as in Example 1 and containing 100 parts by weight of cellulosic fiber was mixed with 20 parts of kaolinite filler and 1 part of bentonite. The kaolinite and the bentonite were each added in the form of an aqueous slurry containing 2 percent by weight of the respective mineral. The bentonite employed was a commercial swelling bentonite from South Dakota sold as SPV Bentonite.

The mixture resulting from the above operations was treated with 0.0128 part by weight of an acrylamide polymer and the resulting suspension employed in forming a paper web on a 78-mesh screen. The acrylamide polymer used was characterized by a viscosity of 1.65 centipoises and was added as an aqueous 0.04 percent by weight solution.

The turbidity of the white water obtained from the screen in the above operation was found to give a reading of 260 determined as in Example 1. The white water from a similar suspension without the addition of the acrylamide polymer gave a turbidity reading of over 470.

*Example 6*

A mixture of bleached sulfite pulp from western conifers and white rag pulp is macerated and beaten in water to form a 1 percent by weight pulp suspension. Kaolinite filler is added to the suspension at a rate of 10 percent by weight and titanium dioxide filler at the rate of 10 percent by weight, both based on the weight of cellulosic fiber in the pulp suspension. Thereafter an aqueous 0.04 percent by weight solution of an acrylamide polymer having a viscosity of 98.5 centipoises is admixed with the suspension to provide a loading of 0.01 percent by weight of the polymer based on the weight of filler in the mixture. It is observed that addition of the acrylamide polymer flocculates the filler in and about the pulp fibers and the white water obtained from a paper-making operation with the polymer-treated pulp-filler mixture is markedly less turbid than the white water from a similar pulp-filler mixture without the polymer.

In addition to the improvement in filler retention, it has been observed that the differences between the wire and felt sides of paper may be decreased by operating in accordance with the present invention.

I claim:

1. A method for the manufacture of paper which comprises the steps of forming an aqueous suspension of cellulosic fiber and mineral filler, said filler comprising from about 1 to 20 percent by weight of bentonite, and adding to said suspension an aqueous solution of an acrylamide polymer characterized by a viscosity of at least 1 centipoise, said polymer being employed in the amount of from 0.005 to about 0.25 percent by weight based on the weight of filler in the suspension.

2. A method for increasing the retention of mineral filler in paper which comprises the steps of forming an aqueous suspension of cellulosic fiber and mineral filler, said filler comprising from about 1 to 20 percent by weight of bentonite and correspondingly from 99 to 80 percent by weight of at least one member of the group consisting of kaolinite, titanium dioxide, talc, diatomaceous earth, terra alba, gypsum, calcium carbonate, magnesium carbonate, barium sulfate, zinc sulfide and lithopone, and adding to said suspension an aqueous solution of an acrylamide polymer characterized by a viscosity of at least 1 centipoise for a 0.5 percent by weight solution thereof in distilled water adjusted to a pH of 3 to 3.5 and at a temperature of 25° C., said polymer being employed in the amount of from 0.005 to about 0.25 percent by weight based on the weight of filler in the suspension.

References Cited in the file of this patent

UNITED STATES PATENTS

| 2,595,935 | Daniel et al. | May 6, 1952 |
| 2,694,629 | Reynolds | Nov. 16, 1954 |
| 2,698,793 | Landes | Jan. 4, 1955 |
| 2,795,545 | Gluesenkamp | June 11, 1957 |
| 2,930,106 | Wrotnowski | Mar. 29, 1960 |
| 2,972,560 | Stilbert | Feb. 21, 1961 |

FOREIGN PATENTS

| 354,510 | Italy | Nov. 27, 1937 |
| 477,265 | Canada | Sept. 25, 1951 |
| 878,935 | Germany | June 8, 1953 |

OTHER REFERENCES

Davis et al.: "Bentonite: Its Properties, Mining, Preparation and Utilization," Technical Paper 609, Bureau of Mines, publ. U.S. Gov't. Printing Office, Wash., 1940, p. 41.